United States Patent Office 3,100,571
Patented Aug. 13, 1963

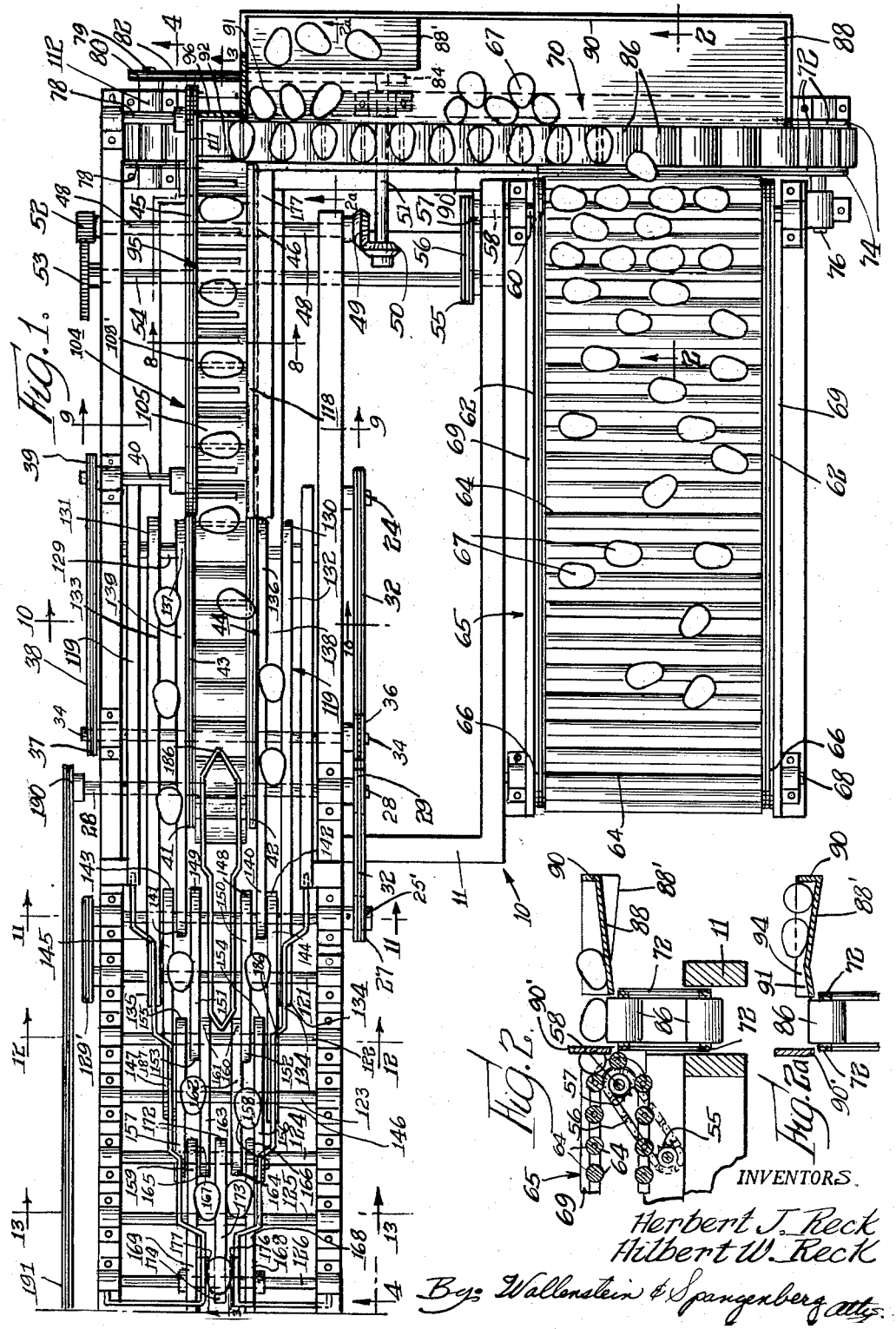

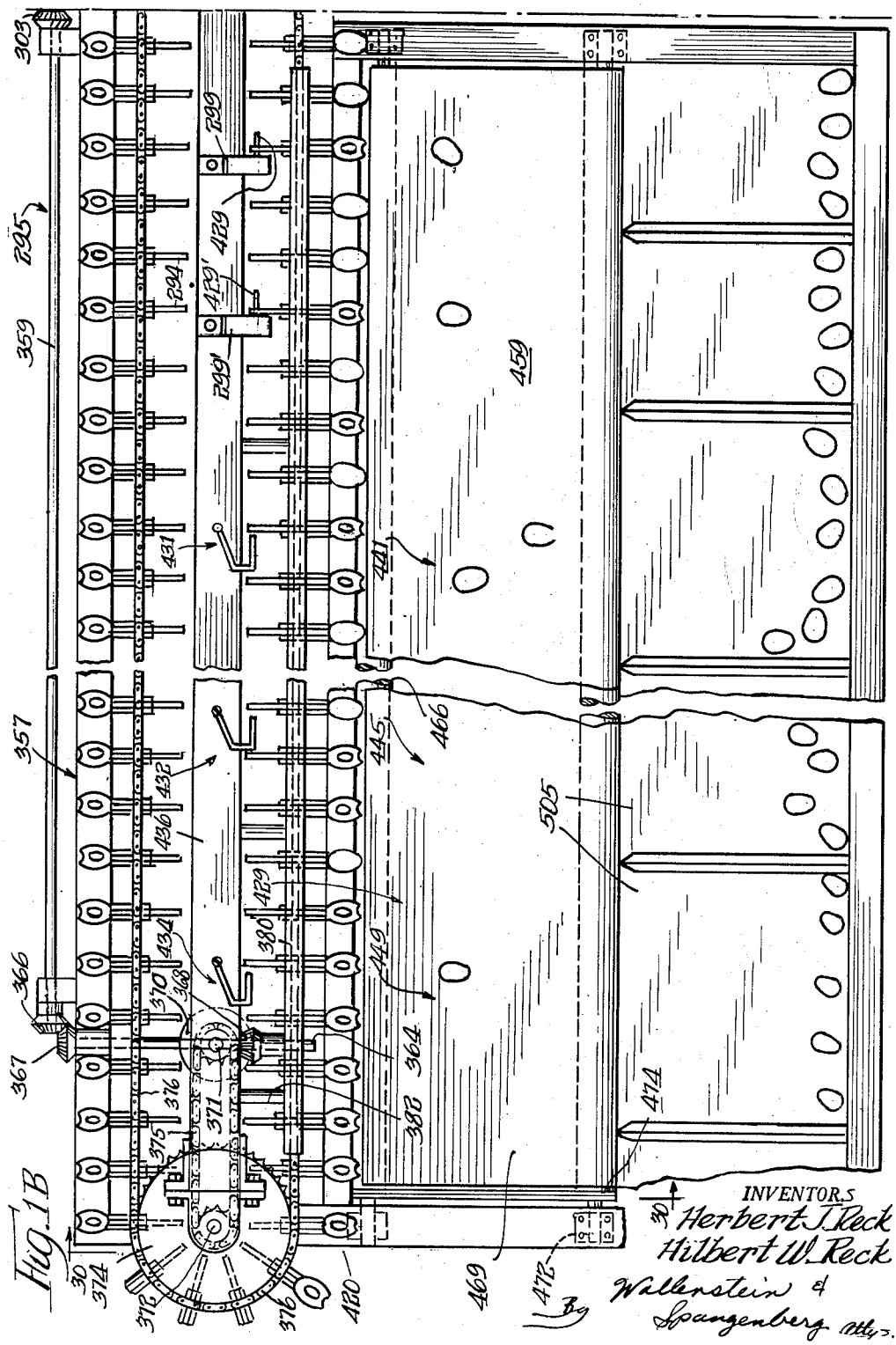

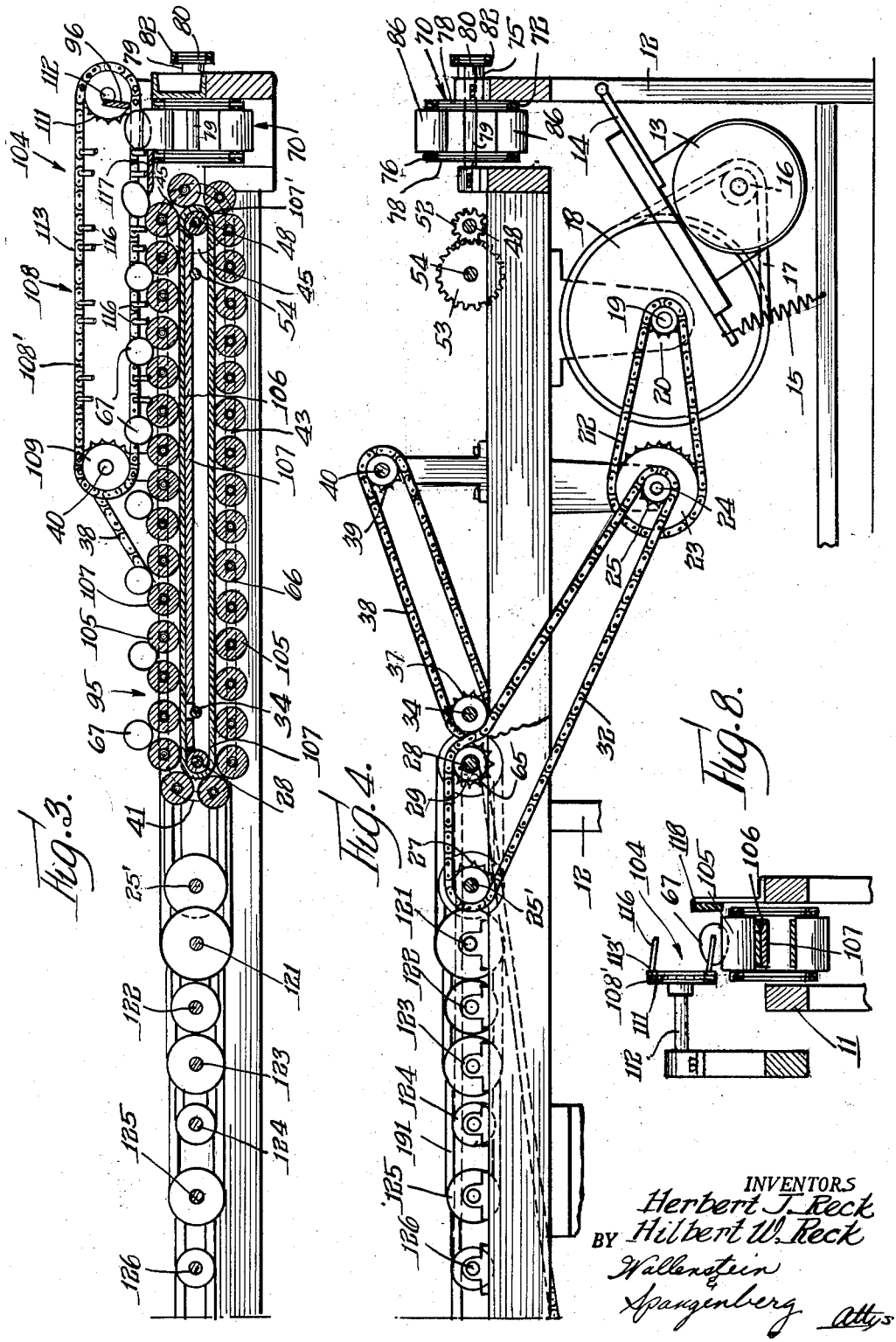

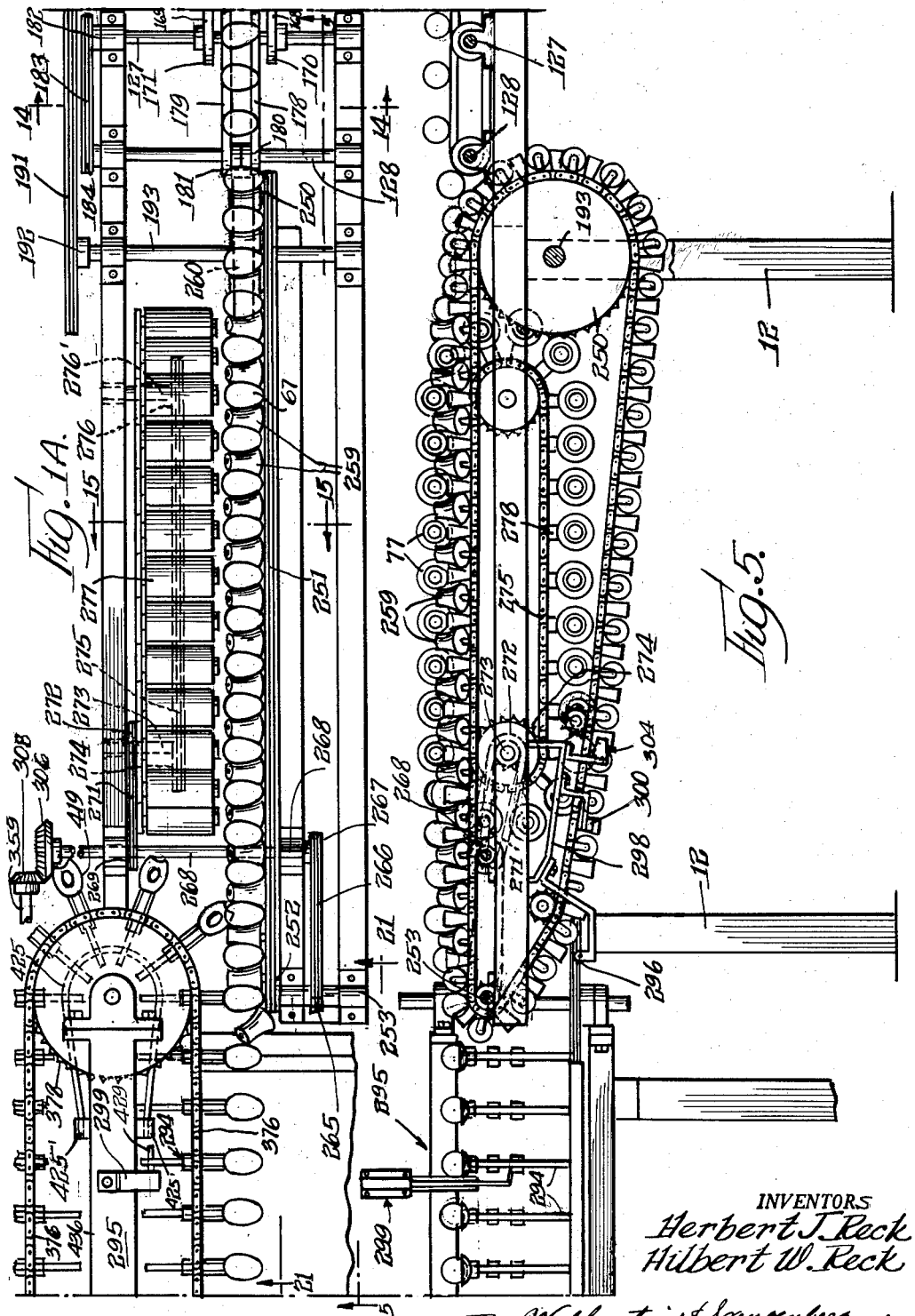

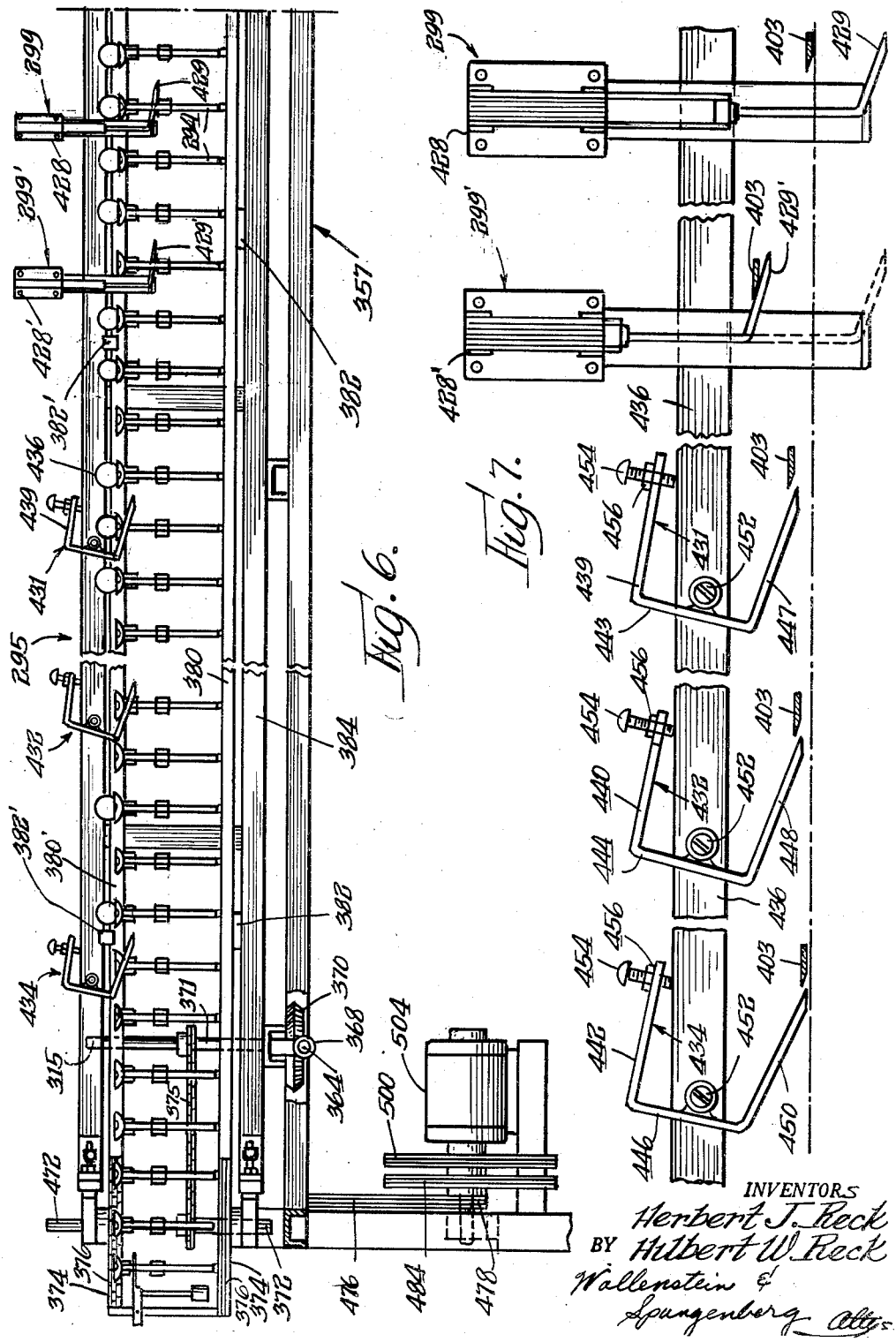

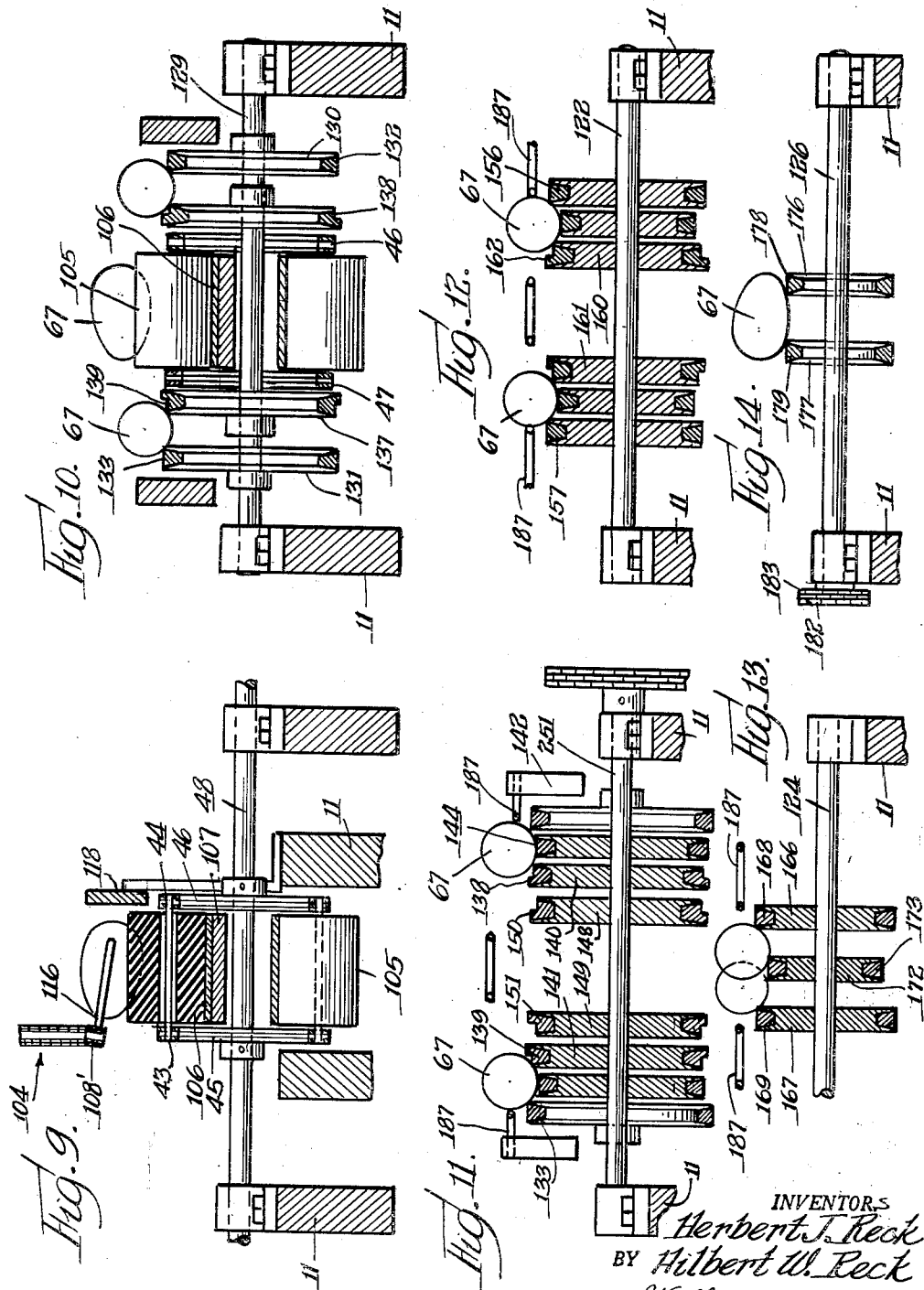

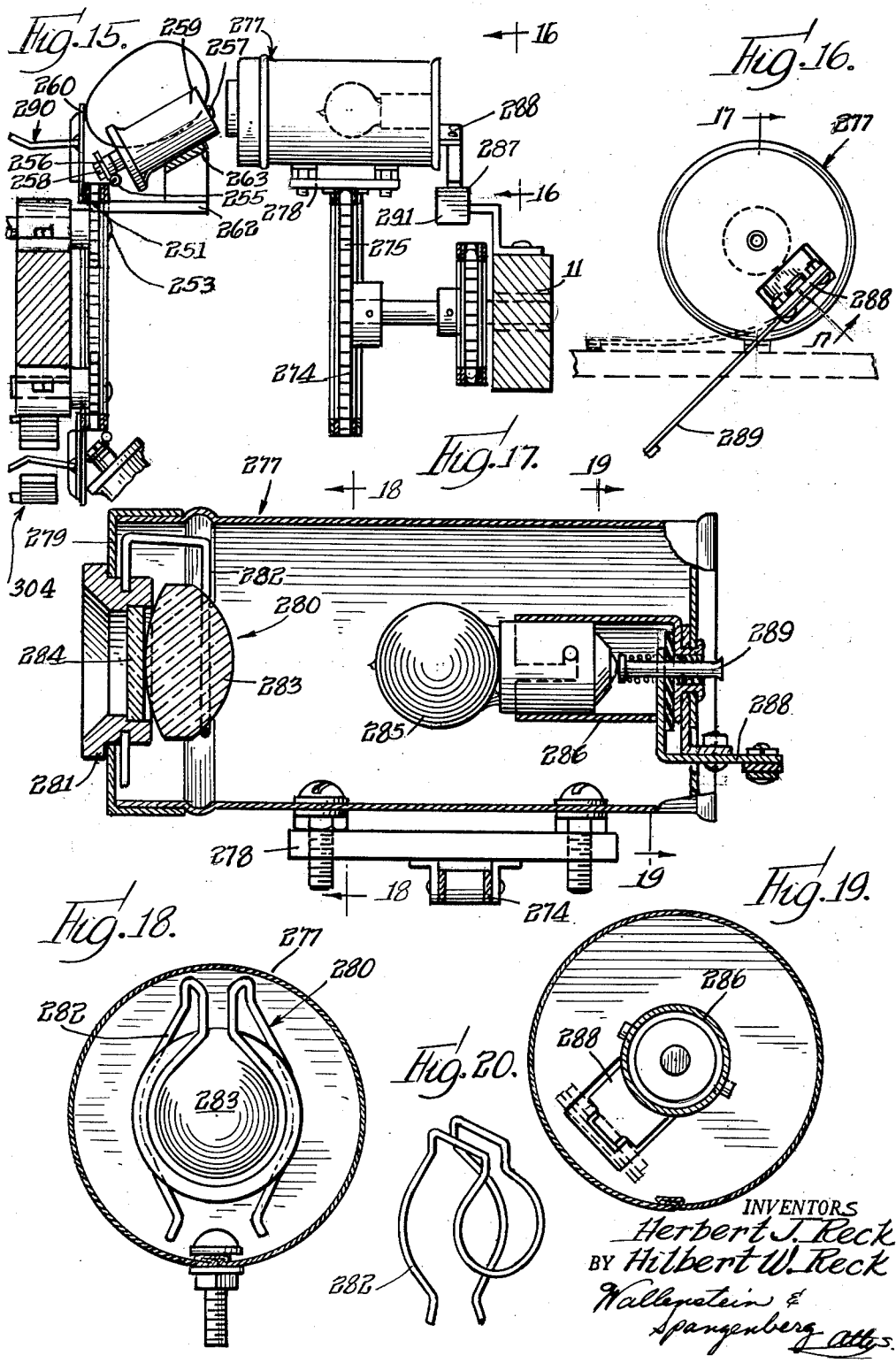

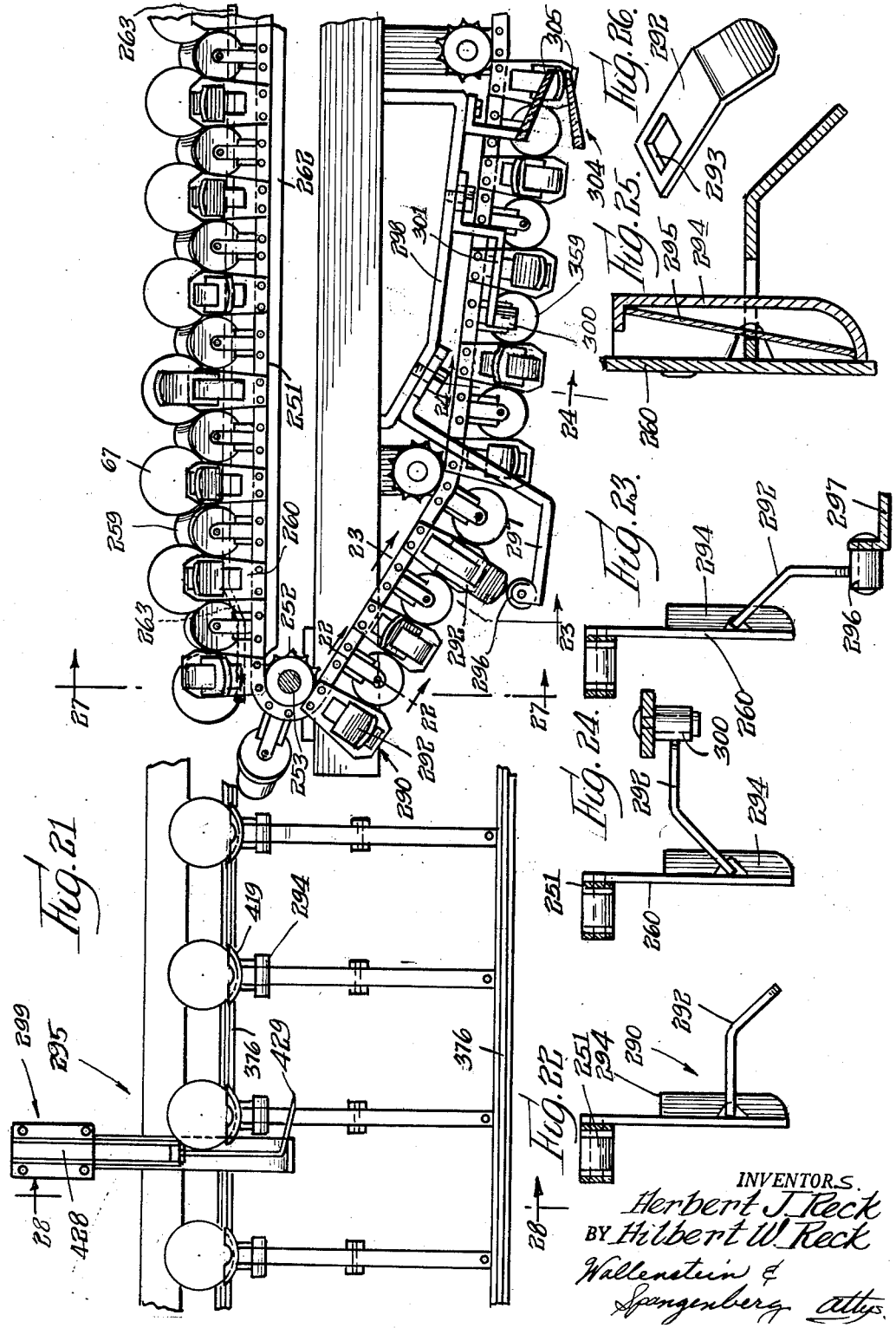

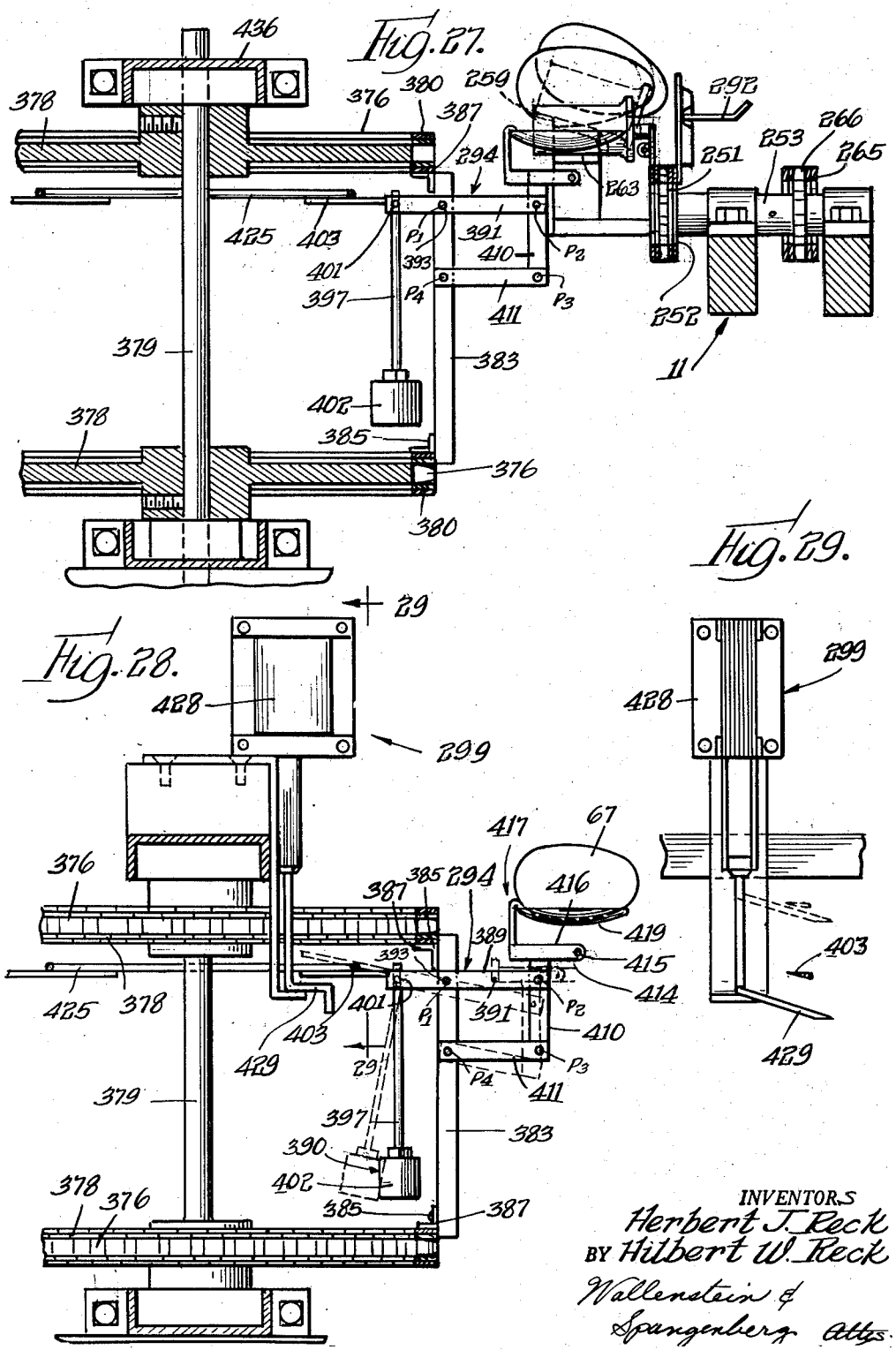

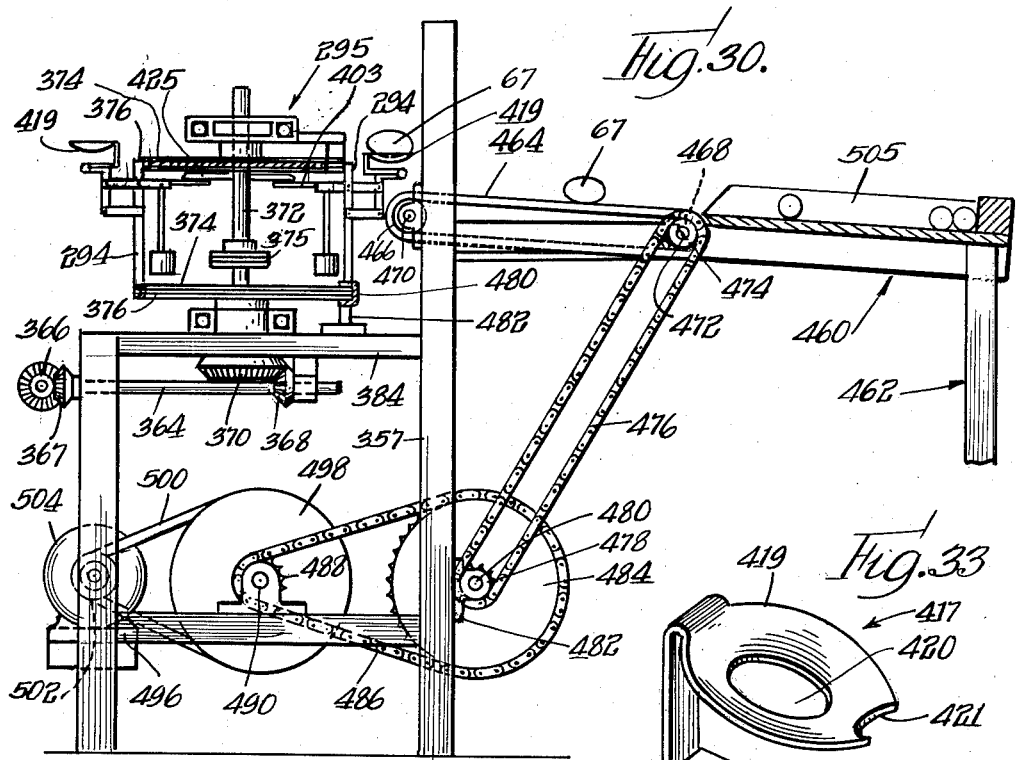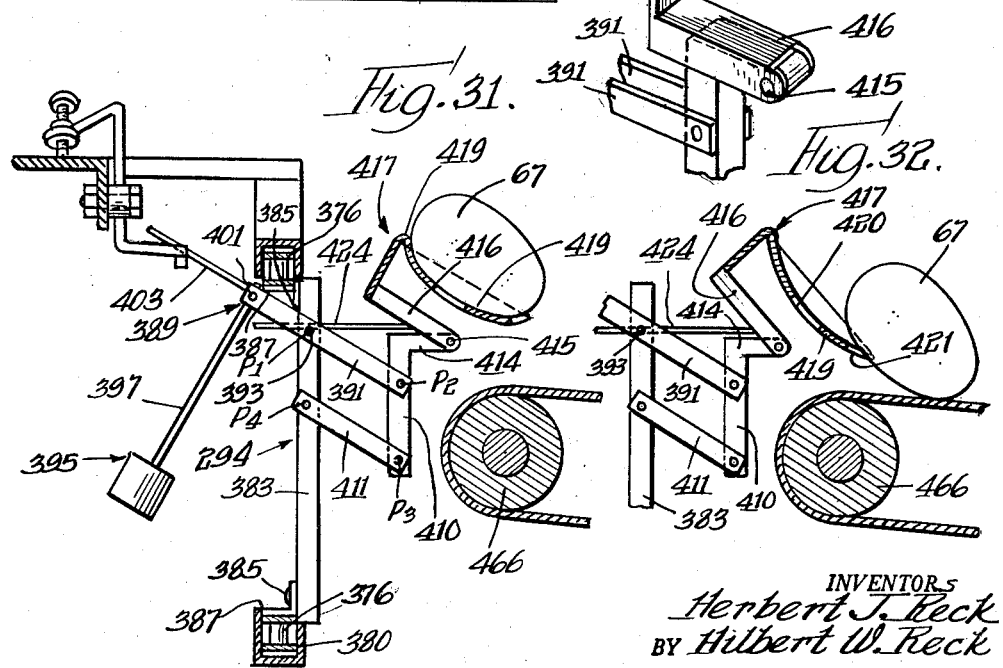

3,100,571
FEEDING, ARRANGING AND GRADING
APPARATUS FOR EGGS
Herbert J. Reck and Hilbert W. Reck, both of
567 River Road, Elgin, Ill.
Filed Jan. 4, 1960, Ser. No. 327
16 Claims. (Cl. 209—121)

This invention relates to apparatus for feeding, arranging and grading eggs or other similarly shaped articles, such an apparatus being particularly adaptable for randomly receiving eggs in bulk, feeding and arranging such eggs with a predetermined orientation to an egg candling device, and then grading the eggs both by the condition of the eggs and the weight thereof. This application is a continuation-in-part of copending application Serial No. 409,668, filed February 11, 1954, entitled Feeding and Arranging Mechanism for Eggs, now Patent No. 2,919,787, granted January 5, 1960, and co-pending application Serial No. 606,522, filed August 27, 1956, entitled Apparatus for Grading Eggs and the Like, now Patent No. 2,994,430, granted August 1, 1961.

In the past it has been usual manually to handle the eggs in arranging the eggs for purposes of candling, grading, breaking or the like. For example, in candling eggs, the candling expert would handle the eggs directly from the bulk, which is a slow and tedious procedure, or else the eggs would be supplied to him in regular fashion by a number of assistants. In either event, labor costs in handling and candling the eggs have been very high.

A principal object of this invention is to provide an improved feeding and arranging apparatus wherein the eggs or other similarly shaped articles are automatically taken from the bulk, arranged in a single file with the long axes of the eggs arranged in parallel and with the small ends of the eggs facing in the same direction, and conveyed in this fashion to suitable devices for candling, grading, breaking or the like, wherein the eggs during candling are spun and arranged with their large or air cell ends facing upwardly, wherein large numbers of eggs may be so handled in an efficient and speedy manner, wherein labor costs in handling the eggs are greatly reduced, wherein manual candling of large numbers of eggs may be rapidly accomplished by a candling expert and a single assistant, the assistant merely feeding eggs in bulk to the egg feeding apparatus, wherein costs of manufacture, installation and maintenance are kept at a minimum, and wherein the construction and operation thereof is simple and foolproof.

Another object of the present invention is to provide egg feeding and arranging apparatus similar to that above described wherein the eggs are initially randomly positioned on a conveyor and then transferred to a second conveyor where the eggs are arranged in single file, the second conveyor being provided with means for holding eggs which overflow the inlet side of the second conveyor and then directing such overflow eggs into empty egg-carrying stations on the second conveyor.

Still another object of the present invention is to provide egg feeding and arranging apparatus as above described wherein the eggs on the second conveyor have a definite predetermined spacial relationship and further wherein means are provided at the discharge end thereof which transfers eggs therefrom onto egg-carrying stations of a third conveyor with a predetermined spacing between the eggs, said third conveyor including means for automatically directing the eggs with their small ends forwardly onto conveyors flanking the third conveyor. A related object of the invention is to provide egg feeding and arranging apparatus as just described wherein the third conveyor carries a series of rollers arranged adjacent each other with their axes extending transversely of the conveyor and means for rotating the rollers so that the eggs in the pockets between adjacent rollers are spun with their longitudinal axes generally parallel to the axes of the rollers, and wherein the means for rotating the rollers includes a surface beneath the rollers upon which the rollers ride, said surface being mounted in such a way that the rollers rotate at a relatively slow speed which is independent of the speed of the third conveyor.

A further object of the present invention is to provide improved egg grading means which make it unnecessary for the operator viewing the eggs at the candling station to manually remove the eggs thereat as was the practice before the present invention and wherein eggs of a relatively poor grade can be identified by the operator and fed by the same conveyor system carrying grade A eggs to a discharge point where they are automatically removed from the conveyor.

A still further object of the invention is to provide egg feeding, arranging and grading apparatus as above described which is reliable and of relatively simple and economical construction.

Preferably, the egg feeding, arranging and grading apparatus of the invention includes a first conveyor upon which large quantities of eggs are randomly placed in both longitudinally and laterally spaced relation. A second conveyor receives the eggs from the downstream end of the first conveyor and conveys the eggs in single file and in a definite orientation and longitudinally spaced relation to the inlet end of a third conveyor carrying egg orienting mechanism which aids in orienting the eggs with their small ends facing in the same direction. The second conveyor preferably includes longitudinally spaced rollers with their axes extending laterally of the conveyor, the contiguous rollers forming egg-receiving pockets therebetween. An egg collecting platform is provided which inclines laterally outwardly from the inlet end of the second conveyor, the platform taking eggs which overflow the second conveyor, such overflow resulting when the eggs randomly fed to the first conveyor are fed to the second conveyor at a higher rate than can be accommodated thereby. The inclination of the platform directs eggs toward the rollers on the second conveyor and thereby causes an egg to roll into an empty pocket moving past the egg collecting platform.

The means for removing the eggs from the second conveyor most advantageously comprises a fourth conveyor moving generally parallel to and alongside the inlet end of the aforesaid third conveyor. The fourth conveyor preferably carries longitudinally spaced pairs of fingers moved in synchronism with the arrival of the egg-receiving pockets of the second conveyor at the discharge end thereof, the forwardmost of the pairs of fingers engaging the outer sides of the eggs at the discharge end of the second conveyor and pushing them onto egg-receiving stations of the third conveyor. The egg-receiving stations of the third conveyor preferably comprise pairs of horizontally oriented egg-spinning rollers arranged with their axes extending laterally of the conveyor and which are rotated during advancement of the third conveyor. The rearwardmost of said pair of fingers act as stop shoulders preventing eggs from rolling forwardly out of the pockets formed by the contiguous rollers into the pockets between the rollers ahead of the same.

When the eggs are spun by the rotating egg-spinning rollers, they will automatically move toward the end of the rollers nearest the small ends of the eggs. Separate conveyors are provided at the opposite ends of the egg-spinning rollers of the third conveyor which receive the eggs as they come off the ends of the rollers with their small ends facing forwardly. If the eggs are rotated too fast by the egg-spinning rollers, they may turn around on the rollers where they are then fed to the opposite ends of the rollers. This may adversely affect the timing of the egg delivery operations carried out by the machine with resultant jamming of the machine, breakage of eggs, etc. Accordingly, another aspect of the invention resides in the provision of means for preventing excessive rotating speeds of the eggs on the egg-spinning rollers. The rollers could be spun by rolling them upon a stationary platform extending beneath the rollers of the third conveyor. In such case, the speed of rotation of the rollers is a function of the speed of the third conveyor, and to prevent excessive speeds of rotation of the rollers it may be necessary to limit the speed of the third conveyor. In accordance with the present invention, the platform upon which the egg-spinning rollers ride is mounted for movement along with the third conveyor but at a slower speed than the lineal speed of the egg-spinning rollers thereon. In such case, the speed of rotation of the egg-spinning rollers is a function of the relative lineal speed of the rollers and the platform upon which they ride.

The eggs on the conveyors flanking the third conveyor are brought together in single file upon a common conveyor. In such case, to reduce the probability of collision, it has been found desirable to space the eggs an appreciable distance on the third conveyor.

The eggs fed to said common conveyor most advantageously arranged with their small ends pointing forwardly. The common conveyor or a conveyor fed from said common conveyor is most advantageously provided with a plurality of spools arranged adjacent each other with their axes parallel, the adjacent spools forming egg-receiving pockets therebetween. Means are provided for rotating the spools as they are advanced by the conveyor carrying the same and for pivotally mounting the same for movement between a position where their axes are generally horizontal, which is the position of the rollers at the inlet and outlet ends of the associated conveyor, and an inclined position opposite a candling station. Such means may comprise a stationary cam track upon which the spools roll. At the candling station, the inclined eggs are oriented with the large ends of the eggs facing upwardly. One or more candling lights are directed against the upward tilted ends of the eggs which can be examined as the eggs are rotated by the spools. A plurality of incandescent light sources are most advantageously provided, the various light sources being mounted upon a common conveyor which advances at the same speed as the conveyor carrying the aforesaid spools, and are spaced apart so as to place a light source opposite each of the egg-receiving pockets of the spools. In this manner, the candler has plenty of time to examine the eggs while they are maintained at points of maximum light intensity without the necessity of stopping the conveyor carrying the spools.

To remove the necessity for the candler to manually remove the low grade eggs at the candling station, so that the candler can concentrate his efforts in inspecting the eggs, means are provided for identifying the condition of each egg and for automatically discharging low grade eggs at one or more predetermined discharge points. This means most advantageously includes individual trip means located at each of the egg-carrying stations of the conveyor carrying the eggs past the candling station. Where three grades of eggs are involved, namely, a grade A or prime quality egg, and relatively low grade B and C eggs, the trip means is manually adjustable to three different positions. The egg candler sees that each of the trip means are in a position indicating the grade of egg involved. The trip means are moved past a first and a second actuating means after leaving the egg candling station. These actuating means are respectively positioned to be operated by trip means positioned to indicate the grade B and C eggs.

When the actuating means are operated, egg-discharging means are energized to discharge eggs from the conveyor system at the discharge points at which grade B and C eggs are to be collected. The actuating means are, of course, positioned to be passed in time sequence and in synchronism with the passage of the eggs past the associated discharge points which are to receive the grade B and C eggs. The eggs could be moved past these discharge points by the same conveyor which moves the eggs past the discharge station. However, in accordance with the most preferred form of the invention, the discharge points for the grade B and C eggs are located along another conveyor carrying egg-weighing fixtures similar to those disclosed in said application Serial No. 606,522 and to which the eggs are transferred after leaving the candling station.

The egg-weighing fixtures disclosed in the latter application include tiltable egg-carrying pockets supported upon the ends of balancing beams, the egg-carrying pockets being tiltable for egg removal purposes. Means are provided at longitudinally spaced egg discharge points along the conveyor carrying the egg-weighing fixtures which means are responsive to different positions of the balancing beams to discharge grade A eggs of various weights at the different discharge or weight sorting points by tilting the egg-carrying fixture pockets. In accordance with the present invention, the discharge points of the grade B and grade C eggs (which are not sorted by weight) are located ahead of the weight sorting points. The aforesaid egg discharging means at the grade B and C egg discharge points may be any suitable means for tilting the egg-carrying pockets of the fixtures when actuated by the aforementioned actuating means.

Further features of this invention reside in the details of construction of the various portions of the egg feeding, arranging and grading apparatus described, and in the cooperative relationships between the component parts thereof.

Other objects and advantages of the invention will become apparent to those skilled in the art upon making reference to the accompanying specification, the claims and the drawings in which:

FIG. 1 is a top plan view of one section of the machine of the present invention;

FIG. 1A is a top plan view of another section of the machine of the present invention, FIG. 1A being an extension of FIG. 1;

FIG. 1B is a top plan view of still another section of the machine of the present invention, FIG. 1B being an extension of FIG. 1A;

FIG. 2 is a fragmentary vertical sectional view through a section of the machine shown in FIG. 1, taken substantially along the line 2—2 therein;

FIG. 2a is a fragmentary vertical sectional view through another portion of the section of the machine shown in FIG. 1, taken substantially along the line 2a—2a therein;

FIG. 3 is a vertical sectional view through the section of the machine shown in FIG. 1, taken substantially along the line 3—3 therein;

FIG. 4 is a vertical sectional view through the section of the machine shown in FIG. 1, taken substantially along the line 4—4 therein;

FIG. 5 is a vertical sectional view through the section of the machine shown in FIG. 1A, taken substantially along the line 5—5 therein;

FIG. 6 is a side elevational view, partly broken away, of the section of the machine shown in FIG. 1B, taken substantially along the line 6—6 therein;

FIG. 7 is an enlarged fragmentary elevational view of a portion of the section of the machine shown in FIG. 6;

FIGS. 8, 9, 10, 11, 12 and 13 are vertical transverse sectional views through the section of the machine shown in FIG. 1, taken substantially along the lines 8—8, 9—9, 10—10, 11—11, 12—12 and 13—13 therein;

FIGS. 14 and 15 are vertical transverse sectional views through the section of the machine shown in FIG. 1A, taken substantially along the lines 14—14 and 15—15 therein;

FIG. 16 is an enlarged end elevational view of the light unit shown in FIG. 15, taken substantially along the line 16—16 therein;

FIG. 17 is an enlarged vertical sectional view through the light unit shown in FIG. 16, taken along section line 17—17 therein;

FIG. 18 is a transverse sectional view through the light unit in FIG. 17, taken along section line 18—18 therein;

FIG. 19 is a transverse sectional view through the light unit of FIG. 17, taken along section line 19—19 therein;

FIG. 20 is a perspective view of a lens-holding clip used in the light unit shown in FIGS. 17 through 19;

FIG. 21 is a fragmentary, enlarged, side elevational view of a portion of the section of the machine shown in FIG. 1A, taken substantially along the line 21—21 therein;

FIG. 22 is a sectional view through FIG. 21, taken substantially along the line 22—22 therein and showing a trip arm in a position indicating a grade A egg;

FIG. 23 is a sectional view through FIG. 21, taken substantially along the line 23—23 therein and showing a trip arm in a position indicating a grade C egg;

FIG. 24 is a sectional view through FIG. 21, taken substantially along the line 24—24 therein and showing a trip arm in a position indicating a grade B egg;

FIG. 25 is an enlarged vertical sectional view through one of the trip arms and the mounting support therefor;

FIG. 26 is a perspective view of the trip arm;

FIG. 27 is a vertical sectional view through the portion of the machine shown in FIG. 21, taken substantially along the line 27—27 therein;

FIG. 28 is a vertical sectional view through the portion of the machine shown in FIG. 21, taken substantially along the line 28—28 therein, and showing the transfer of an egg onto an egg-weighing fixture;

FIG. 29 is an end elevational view through the portion of the machine shown in FIG. 28, taken substantially along the line 29—29 therein and showing alternate positions of the egg-discharging solenoid;

FIG. 30 is an end elevational view, partially in section, of the portion of the machine shown in FIG. 1B, taken substantially along the line 30—30 therein;

FIG. 31 is a view of an egg-weighing fixture shown in FIG. 30 as it is being tilted to discharge an egg at an egg sorting station;

FIG. 32 is a view of a portion of the fixture shown in FIG. 31 just as an egg is being discharged from the fixture; and FIG. 33 is a perspective view of a portion of the fixture shown in FIG. 31.

The preferred form of the feeding and arranging machine for eggs of this invention is generally designated at 10. It includes a frame 11 supported by legs 12 for carrying the various operating parts of the machine. As shown in FIG. 4, an electric motor 13 is carried by a pivoted bracket 14 in turn carried by the frame, and a spring 15 urges the motor 13 downwardly. The motor 13 drives a pulley 16 which is connected by a belt 17 to a pulley 18 fixed to a shaft 19 suitably journaled on the frame. The weight of the motor and the spring 15 operate to maintain the belt 17 tight on the pulleys 16 and 18. Thus, the shaft 19 is rotated as the motor 13 is operated. The shaft 19 carries a sprocket wheel 20 which, in turn, is connected by a chain 22 to a sprocket wheel 23 mounted on a shaft 24 which is also journaled for rotation on the frame 11. The shaft 24 carries another sprocket wheel 25.

A shaft 25' journaled on the frame 11 carries a sprocket wheel 27. Likewise, a shaft 28 journaled on the frame carries a sprocket wheel 29. A chain 32 extends around the sprocket wheels 25, 27 and 29 thereby rotating shafts 25' and 28 as the shaft 24 is rotated by the motor. The drive for the various parts of the mechanism of this invention is taken from the shafts 25' and 28.

The frame also carries a shaft 34. A sprocket wheel 36 on the shaft 34 meshes with the chain 32. Shaft 34 also carries a sprocket wheel 37 (FIG. 1) which is connected by a chain 38 to a sprocket wheel 39 secured to a shaft 40. Sprocket wheels 41 and 42 on the shaft 28 are connected by chains 43 and 44 to sprocket wheels 45 and 46 on shaft 48. In this way, shaft 48 is rotated. Shaft 48 carries a bevel gear 49 at one end meshing with a bevel gear 50 carried on a shaft 51. The shaft 48 also carries a pinion gear 52 which meshes with a gear 53 on a shaft 54. The shaft 54 carries a sprocket wheel 55 around which extends a chain 56 which passes over a sprocket wheel 57 secured to a shaft 58. The shaft 58 carries a pair of sprocket wheels 60—60 around which extend chains 62—62 which support therebetween longitudinally spaced cylindrical members 64 forming therebetween egg-carrying pockets. The chains 62—62 pass around sprocket wheels 66—66 which are fixed to the end of a shaft 68 journaled upon the frame 11. The cylindrical members 64 and the chains 62—62 form an endless conveyor 65 which carry eggs 67 randomly placed upon the top section thereof at the left-hand or inlet end of the conveyor. The eggs placed upon the conveyor 65 are positioned in both longitudinally and laterally spaced relation thereon as shown in FIG. 1. Stationary side walls 69—69 extend upwardly from the frame 11 on opposite sides of the upper section of the conveyor to prevent eggs from rolling off the sides thereof. At the right-hand or outlet end of the conveyor 65, the eggs are discharged upon the upper section of an endless conveyor 70 moving transversely of the conveyor 65.

Conveyor 70 comprises a pair of endless chains 72—72 which at one end pass around a pair of sprocket wheels 74—74 mounted upon a shaft 76 journaled upon the frame 11. The opposite ends of the chains pass around sprocket wheels 78—78 mounted on a shaft 79 journaled on the frame 11. The shaft 79 carries a sprocket wheel 80 on the end thereof, around which extends a chain 82 which passes around a drive sprocket wheel 84 connected upon the end of the aforesaid drive shaft 51 driven by the bevel gears 49 and 50. Conveyor 70 has a series of longitudinally spaced rollers 86 carried by the chains 72—72, the rollers forming therebetween equally spaced egg-receiving pockets of a size which accommodates only one egg at a time. Conveyor 70 thus carries eggs in a definite longitudinally spaced relation and in single file toward the outlet end of the conveyor 70. As shown most clearly in FIG. 2, the rollers 86 at the upper section of the conveyor 70 are at a level slightly below the level of the upper section of the conveyor 65. The eggs discharged from the ends of the conveyor 65 roll upon the rollers 86 and assume a position in said egg-receiving pockets between the rollers where the longitudinal axes thereof are parallel to the axes of the rollers.

Since the eggs are placed in random fashion upon the conveyor 65, at times more or less eggs than can be accommodated by the conveyor 70 are discharged thereupon. In the former situation, the eggs will obviously overflow the conveyor 70. In accordance with one aspect of the invention, an outwardly and upwardly extending egg-receiving platform 88 is supported from the framework 11 on the outside of the conveyor 70 so that eggs which overflow the inlet end of the conveyor 70 will roll upon the platform 88. The inner end of the platform 88 is at the level of the rollers 86 on the conveyor 70, so that the overflow eggs are urged by gravity toward the conveyor 70 so that whenever an empty pocket of the conveyor 70 moves thereby an egg on the platform will roll into this pocket. A marginal wall 90 extends upwardly along the outer longitudinal and transverse end margins of the platform 88 to prevent eggs from rolling off the platform 88 should the latter become filled with eggs. In the embodiment of the invention illustrated in the drawings, the platform 88 extends a substantial distance beyond the inner longitudinal margin of the conveyor 65 in the direction of the outlet and of the conveyor 70, so that the platform can accommodate a large number of eggs. In fact, the inner section of the platform 88 has a narrow extension 91 of a width which can accommodate only one egg across its width and which extends to a discharge station 92 of the conveyor 70 at which the eggs are discharged therefrom onto a conveyor 95. The upper longitudinal margin of the platform extension 91 joins a downwardly and outwardly inclining platform section 88' which catches eggs overflowing the platform extension 91. The portion of the marginal wall 90 nearest the discharge station 92 has a short longitudinal extension 96 which backs up the eggs at the outer side of the discharge station 92 to prevent eggs from falling off the outer side of the conveyor 70 thereat. A wall 90' extends upwardly along the inner side of conveyor 70 between the discharge end of conveyor 65 and the discharge station 92 to prevent eggs from rolling off the inner side of the conveyor 70.

A conveyor generally indicated by reference numeral 95 receives the eggs from the discharge end of the conveyor 70 and, in a manner to be explained, effects the discharge of the eggs alongside the conveyor 95 with the small ends of the eggs facing forwardly. This means includes a plurality of contiguous rollers 105 rotatably carried by the aforesaid chains 43—44 which rollers provide egg-receiving pockets therebetween. When the rollers are on the upper section of the conveyor 95 they roll upon the upper section of an endless belt 106 riding on a stationary support platform 107. The belt 106 driving the conveyor 45 and carried on the shafts 28 and 48 moves with the conveyor 95 but at a somewhat smaller linear speed. To this end, the belt 106 extends around pulley wheels 107—107' carried on the shafts 28 and 48 which pulley wheels have a smaller diameter than the sprocket wheels 41 and 42. It is thus apparent that the belt 106 moves at a somewhat slower linear speed than the rollers 105 and so there is relative movement between the rollers 105 and the belt 106 so that the rollers will rotate as the conveyor 95 and the belt 106 are advanced by the motion imparted thereto from the drive shaft 28. If the rollers 105 were to ride on the stationary platform 107 instead of the moving belt 106, the speed of rotation of the rollers 105 would be a direct function of the speed of the conveyor 95 and would rotate much faster than when belt 106 is used. This could create problems which will be explained in more detail below.

The egg-receiving pockets between the rollers 105 position the eggs with their long axes parallel to the axes of the rollers. The eggs are moved from the discharge end of the conveyor 70 delivered to these egg-receiving pockets by egg pushing means generally indicated by reference numeral 104. This means includes a vertically oriented endless chain conveyor 108 which moves at the same speed and in the same direction as conveyor 95. The conveyor 108 comprises a chain 108' which at one end passes around a sprocket wheel 109 carried on shaft 40 and at the other end passes around a sprocket wheel 111 supported upon a freely rotating shaft 112 positioned at a point outwardly of the conveyor 70 (FIG. 3). Chain 108' may be a conventional type link chain with pins 113 passing through and joining together contiguous links. Some of the pins 113' have extensions forming egg-pushing fingers 116. The fingers are arranged in pairs as shown most clearly in FIGS. 1 and 3 which are spaced to be brought opposite the discharge end of the conveyor 70 in timed relation with the advancement thereto of the egg-carrying pockets formed by the rollers 86 of the conveyor 70. The linear speed of the conveyor 95 carrying the rollers 105 is such that a pair of the fingers 116 is brought into position at the inlet end of the conveyor 95 during the passage thereby of alternate egg-receiving pockets of the conveyor 95. The bottom section of conveyor chain 108' is positioned slightly above the top of the rollers 105 at the upper section of the conveyor 95. The weight of the pin extensions forming the fingers 116 tilts the chain 108' downwardly (except at the drive sprocket wheels 109 and 111) so that the fingers 116 depend below the general level of the bottom section of the chain 108' to thereby extend into the path of movement of the eggs as they come off the conveyor 70. The forwardmost of each pair of fingers 116 engages the outer end of the egg involved and pushes the same off the conveyor 70 onto a stationary platform 117 where the eggs roll into an egg-receiving pocket between a pair of the rollers 105. As shown most clearly in FIG. 3, when the fingers 116 are moving alongside the upper section of the conveyor 95, the forwardmost finger 116 of each pair is located slightly rearwardly of the center line of the roller just forwardly of the same and the rearwardmost finger 116 is located slightly forwardly of the center line of the roller just rearwardly of the same. The eggs are thus kept from rolling out of one pocket into another pocket. The placement of the eggs in alternate pockets of the conveyor 95 has been found highly advantageous to prevent collision of the eggs in a section of the machine soon to be described.

As the rollers 105 advance the eggs, the rollers rotate upon the aforesaid belt 106 and thereby impart rotation to the eggs in the pockets between the rollers. The axes of these eggs are maintained substantially parallel to the axes of the rollers but tilted slightly therefrom, and, as a result, the eggs move along and are discharged small end first off the ends of the rollers towards which the small ends of the eggs are pointing. It is important to prevent excessive rotating speeds of the eggs and hence the rollers 105 which would cause the eggs to turn around upon the rollers. This is the reason why the rollers roll upon a moving belt 106 rather than the stationary platform 107 since the moving belt 106 reduces the speed of rotation of the rollers 105 and the eggs carried thereupon.

Along a portion of the advancing path of the rollers 105 on the upper section of the conveyor 95 is a guard rail 118 which prevents the eggs from rolling off the conveyor until they are carried opposite a pair of belt conveyors 119—119.

The frame 11 beyond the path of the advance of the rollers 105 in the upper section of the conveyor 95 is provided with a plurality of parallel shafts 121, 122, 123, 124, 125, 126, 127 and 128. These various shafts carry pulleys which in turn carry belts which form the aforesaid conveyors 119—119. A pair of pulleys 130 and 131 are secured to a shaft 129 journaled on the frame 11 and the pulleys are connected respectively by belts 132 and 133 to pulleys 134 and 135 secured to the shaft 121. The shaft 121 may be driven by a chain or belt transmission 129' (FIG. 1) driven from the aforesaid shaft 25'. Likewise, a pair of pulleys 136 and 137 are secured to the shaft 129 and are provided with belts 138 and 139 extending to pulleys 140 and 141 secured to the shaft 25'.

The belts 132, 133, 138 and 139 are driven forwardly at the same linear speed as the speed of linear advance of the rollers 105. As the eggs are discharged small end first off of the ends of the rollers 105, they fall upon the advancing belts 132, 133, 138 and 139 with their small ends pointing forwardly, this being due primarily to the slight tilting of the long axes of the eggs as they are discharged from the rollers. As shown in FIG. 10, the inner sides of the belts 138 and 139 are provided with protruding flanges which further assist in turning the eggs small end forwardly on the belts when they are received thereon from the rollers.

The shaft 25' also has secured thereto a pair of pulleys 142 and 143 from which belts 144 and 145 extend to pulleys 146 and 147 secured to the shaft 123. Another pair of pulleys 148 and 149 are secured to the shaft 25' and a pair of belts 150 and 151 extend from these pulleys to pulleys 152 and 153 secured to shaft 122. A pair of pulleys 154 and 155 are secured to shaft 122 and a pair of belts 156 and 157 extend from these pulleys to a pair of pulleys 158 and 159 secured to shaft 124. A pair of pulleys 160 and 161 secured to shaft 122 carry belts 162 and 163 which extend to pulleys 164 and 165 secured to shaft 124. The shaft 124 carries a pair of pulleys 166 and 167 from which extend belts 168 and 169 to pulleys 170 and 171 secured to shaft 127. A pulley 172 is secured to shaft 124 and carries a belt 173 which extends to a pulley 174 secured to shaft 126. A pulley 176 is secured on the shaft 126 and a pulley 177 is freely mounted on the shaft 126. These pulleys 176 and 177 carry belts 178 and 179 respectively, the belt 178 extending over a pulley 180 which is free on the shaft 128 and the belt 179 extending over a pulley 181 which is secured to the shaft 128. The shaft 127 carries a sprocket wheel 182 which is connected by a chain 183 to a sprocket wheel 184 secured to the shaft 128. The sprocket wheel 182 has a greater diameter than the sprocket wheel 184 so that the shaft 128 is driven more rapidly than the shaft 127. Since the pulley 181 is secured to the shaft 128 and the pulley 175 is secured to the shaft 126, the other pulleys 180 and 177 being freely mounted, the belt 179 will be driven faster than the belt 178.

As pointed out above, the advancing belts 132, 133, 138 and 139 receive the eggs from the advancing and rotating rollers 105 and operate to convey the eggs forwardly with their small ends all pointing forwardly. The various intermediate belts 144, 145, 150, 151, 156, 157, 162, 163, 168 and 169 operate to transfer the eggs from the belts 132, 133, 138 and 139 onto the belts 178 and 179 in single file with the small ends of the eggs pointing forwardly. To assist in guiding the eggs along these intermediate belts, there are provided guide members in the form of wires or the like, an inner guide member 186 and an outer guide member 187. In this way, the two rows of eggs collected on the conveyor means on opposite sides of the path of advance of the rollers 105 are converged into single file in a forwardly pointing manner and transferred to the belts 178 and 179. The belts 178 and 179 convey the eggs forwardly and, due to the fact that belt 179 is driven faster than belt 178 turn them around so that their axes are side by side and parallel with their small end all pointing in the same direction.

A sprocket wheel 190 is secured to the outer end of the shaft 28 and a chain 191 extends from this sprocket wheel to a sprocket wheel 192 secured to a shaft 193. The shaft 193 carries a sprocket wheel 250. A chain 251 extends over this sprocket wheel 250 and over a sprocket wheel 252 carried by a shaft 253 suitably journaled on the frame 11. The chain 251 carries a plurality of brackets provided with a pivot 255 and a pivoted member 256. A pin 257 is secured to each pivoted bracket member 256 and is held in place by nuts 258. A spool 259 is rotatably carried by each pin 257. Secured to the opposite side of the chain 251 and between the brackets 254 are a plurality of plate members 260 which hold the eggs on the spools when they are tilted upwardly.

The upper portion of the chain 251 rides on a member 262 which supports the same and the member 262 carries a cam track 263. As the sprocket wheel 250 is rotated the chain 251 is advanced and carries the spools 259 along therewith. The spools adjacent the sprocket wheel 250 are arranged in a horizontal position. As the spools are advanced from the sprocket wheel 250 toward the other sprocket wheel 252, the spools are tilted upwardly by the cam track 263 as illustrated more clearly in FIG. 15. The eggs are transferred onto the spools 259 from the belts 178 and 179 when the spools are horizontally arranged. As the spools advance the eggs they are rotated by engaging the cam track 263 and they are also tilted upwardly as shown in FIG. 15. The eggs carried thereby are therefore spun and are tilted to a position where their large air cell ends are directed upwardly. When the spools 259 approach the sprocket wheel 252 the cam track 263 lowers the spools 259 and hence the eggs to horizontally arranged positions. Shaft 253 also carries a sprocket wheel 265 which is connected by a chain 266 to a sprocket wheel 267 carried by a shaft 268. Shaft 268 also carries a sprocket wheel 269 which is connected by a chain 271 (FIG. 1A) to a sprocket wheel 272 mounted on a shaft 273. Shaft 273 also carries a sprocket wheel 274 which meshes with a conveyor chain 275. The chain 275 also passes around a sprocket wheel 276 mounted on a shaft 276'. The chain 275 moves at the same linear speed as the chain 251 carrying spools 259.

A plurality of light boxes 277 are secured to the chains 275 by brackets 278, the boxes 277 being carried along by the chain 275. As illustrated, the boxes 277 are cylindrical in shape with their axes generally horizontal and extending transverse to the conveyor chain 275. The boxes 277 are provided at one end with removable enclosures 279 carrying lens assemblies 280. Each enclosure 279 has a central opening in which is supported an apertured lens frame 281. The lens frame carries a metal lens-carrying clip 282 having a loop in which is supported the end of a lens element 283. The lens frame also carries another lens element 284. The lens elements 283 and 284 concentrate beams of light from an incandescent bulb 285 mounted in a socket 286 at the opposite end of the light box. The light beams are directed respectively through the upper ends of the eggs at the candling station of the machine. The light boxes 277 are so positioned upon the chain 275 that the axes of the lens assemblies 280 are located in vertical planes passing between the spools 259. Each of the lamps 285 may have a filament which is grounded at one end in any suitable way, such as through the metal walls of socket 286 and the frame 11 of the machine and which is connected at the other end to an insulated terminal conductor 288 extending from the lamp socket 286. Each of the terminal conductors 288 carries a spring wiper or contact member 289 which electrically contacts a stationary conductive track 287 (FIG. 15) supported by an insulating bracket 291 upon the frame 11. The conductive track 287 is electrically connected to a suitable source of voltage (not shown). The conductive track 287 is only in the path of movement of the wipers 289 in the upper section of the chain 275 so that the incandescent lights 285 are only illuminated when the light boxes 277 are in their candling positions opposite the eggs carried on the spools 259. It is thus apparent that, as the eggs are moved past the candling station of the machine, the upper ends of the eggs receive maximum illumination for a period of time. This allows faster operation and more accurate candling by the operator.

As is well known, the candling operation is for the purpose of sorting out the good eggs from the bad. Heretofore, the relatively low grade eggs were manually removed from the conveyor at the candling station by the operator leaving only the best quality or grade A eggs on the conveyor. The relatively low grade eggs are generally classified into two grades, grade B and grade C. The operator thus had the additional responsibility of removing and sorting both grade B and grade C eggs in addition to inspecting the eggs and thus could not concentrate fully on his prime purpose of candling the eggs. Therefore, in accordance with another aspect of the invention, means are provided for enabling the operator to identify the three grades of eggs at the candling station without requiring the removal of the eggs thereat. Automatic means are provided for removing the grade B and grade C eggs at locations remote from the candling station. To this end, there is associated opposite each contiguous pair of spools 259 egg grade identifying means generally indicated by reference numeral 290. This means may include a three-position trip arm 292 having an intermediate position shown in FIG. 22 which indicates a grade A egg, and extreme upwardly and downwardly extending positions which indicate respectively the relatively two low grade of eggs. Each of the trip arms 292 as illustrated is provided with a perforation 293 (FIG. 26) at one end, which end extends into a housing 294 secured to an egg-holding plate member 260. A leaf spring 295 extends through the perforation 293 where it bears down upon the innermost defining wall of the perforation 293 to provide the aforesaid three stable arm positions. When the candler sees a grade A egg, he leaves the associated trip arm 292 in the aforesaid intermediate position which is in the position of the trip arm as it is carried to the candling station. When he sees a grade B egg, he positions the trip arm in a relative downward position considering the position of the trip arm when it is carried on the upper section of the spool carrying conveyor, and, when he sees a grade C egg, he positions the trip arm in an upward position.

When the spools 259 are carried to the end of the upper section of the conveyor chain 275, the cam track 263 suddenly drops to a position where the spools and the eggs supported thereby extend generally horizontally. Then, as the spools are brought around the sprocket wheel 252, the eggs lose support and are taken up by the egg-weighing fixtures 294 of a conveyor 295. As the trip arms 292 of the spool-carrying conveyor are moved into the lower section of the conveyor, the positions of the trip arms are reversed so that the trip arms positioned to identify grade B eggs have an upwardly extending position as shown in FIG. 24, and the trip arms positioned to identify grade C eggs have a downwardly extending position as shown in FIG. 23. The trip arms which are in a downwardly extending position at the lower section of the spool-carrying conveyor move into the path of a roller 296 carried on the end of an arm 297 secured for longitudinal adjustment on a mounting plate 298 carried by the frame 11. When the trip arm contacts the roller 296, egg-discharging mechanism 299 to be described positioned at a first egg sorting or discharge station beside the fixture conveyor 295 is operated to discharge a grade C egg from an egg weighing fixture 294 on the conveyor 295. The roller 296 forms part of an actuating circuit (not shown) which is grounded when a trip arm touches the roller 296.

The trip arms which are in an upwardly extending position at the lower section of the spool carrying conveyor to identify a grade B egg are moved into the path of a roller 300 carried on the end of an arm 301 secured for longitudinal adjustment on the mounting plate 298. When the trip arm contacts roller 300, egg-discharging mechanism 299′, to be described positioned at a second egg sorting or discharge station beside the fixture conveyor 295, is operated to discharge a grade B egg from the egg weighing fixture on the conveyor 295. The roller 300 forms part of an actuating circuit (not shown) which is grounded when a trip arm touches the roller 300.

After the trip arms are carried by the roller 300 they are passed into a restoring or reset unit 304 which sets all trip arms into the intermediate grade A identifying position. Since most eggs are grade A, the restoring unit eliminates the necessity for the operator manually to set each trip arm at the candling station. The restoring unit may comprise upper and lower, spaced forwardly converging walls 305—305 which cam any trip arms in an upward or downward position into said intermediate position.

The fixture conveyor 295 is obviously operated in timed synchronism with the operation of the other conveyors so that a new fixture 294 is brought beneath each of the eggs as the associated spool is dropped around the sprocket wheel 252. To this end, a power takeoff for the conveyor 295 is taken from the aforesaid shaft 268 by means (FIG. 1A) including a bevel gear 306 carried by the shaft 268 which gear meshes with another bevel gear 308 connected to a drive shaft 359 journaled on the framework 357 of the fixture conveyor 295. Shaft 359 carries a bevel gear 366 which meshes with a bevel gear 367 carried on a shaft 364. The shaft 364 carries a bevel gear 368 which meshes with a bevel gear 370 supported for rotation about a vertical axis. The bevel gear 370 is fixed to a shaft 371 suitably journaled upon the support structure 357.

The shaft 371 is coupled to another vertical shaft 372 at the end of the support structure 357 by a chain and sprocket transmission 375. Supported in vertically spaced relation upon the shaft 372 are large chain sprocket wheels 374—374. Each of these sprocket wheels drives an endless chain 376—376 which passes around respective vertically spaced sprocket wheels 378—378 rotatably supported at the other end of the frame structure 357 upon a shaft 379 carried by the support structure 357. The chains 376 ride within vertically spaced guides 380—380′ carried by brackets 382—382.

The weighing fixtures 294 are secured between corresponding portions of the upper and lower endless chains 376—376. These fixtures, which are equally spaced along these chains, are shown most clearly in FIGS. 27, 28 and 31 through 33 to which reference should now be made. They each include a vertical beam support post 383 which is secured at its upper end by a screw 385 to an ear 387 secured to a link of the chain 376. The lower end of the beam support post 383 is similarly secured by a screw 385 to an ear 387 secured to the lower chain 376. A balancing beam 389 is pivotally secured intermediate its ends to the bar 383. This beam is formed from two similar metal bars 391—391 which are pivoted to opposite sides of the post 383 at 393—393. When the fixture is secured to the chains 376—376, the balancing beam extends transversely of the length of the conveyor chains. Secured to the end of the beam 383 nearest the inner portion of the conveyor 295 is a counter weight assembly 395. This assembly includes a rod 397 which is fixed at its upper end to the beam arms 391—391 by a nut and bolt 401. Removably threaded around the bottom end of the rod 397 is a cylindrical counter weight 402. Extending inwardly longitudinally from the end of the beam arms 391—391 is a cam engaging extension blade 403.

Pivotally secured to the opposite end of the balancing beam 389 is a vertical carrier support member 410. The member 410 extends below the beam 389 where it pivotally connects with a pair of opposed connecting links 411—411. The inner ends of the links 411—411 are pivotally connected to opposite sides of the beam support post 383. The points of pivotal support for the beam arms 391—391, carrier bar 410 and the connecting links 411—411 fall along the corners of a parallelogram at P1, P2, P3 and P4. Because of this arrangement, the carrier support member 410 is maintained in a vertical direction independently of the angle tilt of the balancing beam.

The carrier support member 410 extends a short distance above the beam 389 and at the top of this bar is secured a horizontal support 414 which has a hinge 415 at the forward or outermost end thereof. Pivotally supported on the hinge 415 is the base 416 of an egg-receiving means 417. The latter means includes a spoon-shaped egg support 419 having a spoon or oval shaped body oriented with its longitudinal axis extending normal to the axis of the hinge 415. The spoon-shaped support 419 has a longitudinally extending oval shaped opening 420 in the center portion of the bottom thereof of a size which is substantially smaller than the smallest egg to be accommodated thereby and which enables it to carry eggs of widely varying sizes, and a truncated tip portion formed by an opening 421 in the forward tip thereof so that an egg will readily roll off the support 419 when it is tilted downwardly in a forward direction. The egg-receiving means 417 is supported in a generally horizontal position upon the horizontal member 414 carried by the carrier bar 410. Normally, therefore, the plane of the eggs support 419 is maintained in a horizontal plane for substantially all angular positions of the balancing beam 389 for eggs within the range of weights to be used with the apparatus. As is apparent from the description of the weighing fixture, the heavier the eggs supported upon the egg-receiving means 417, the lower is the outer or forward end of the balancing beam and the higher is the opposite end of the balancing beam.

Means are provided for tilting the egg-receiving means about the axis of the hinge 415 when the forward or outer end of the balancing beam is lowered beyond the limit obtained with an egg of the largest expected weight. This means includes a lift rod 424 which extends generally horizontally from the beam support post 383 immediately below the bottom of the balancing beam. When the beam reaches the angle of tilt indicated by dotted lines in FIG. 28, the lift rod 424 initially makes contact with the bottom of the rear or inner portion of the base 416 of the egg-receiving means 417. Further tilting of the balancing beam will cause the lift rod to tilt the egg-receiving means about its pivot axis to the position shown in FIG. 32 where the eggs supported thereon falls from the egg support 419. The lift rod projects rearwardly of the beam support bar to stop the downward movement of the rear end of the balancing beam beyond a horizontal position.

The balancing beams of the fixtures to be moved opposite the spool carrying conveyor are held rigidly in a horizontal position by means of a stationary cam support member 425 under which the cam-engaging extensions 403 of the fixtures pass. The balancing beams cannot move in either direction in this case because the cam member 425 prevents upward movement of the associated balancing beams and the rear extensions of the lift rods 424 prevent downward movement of the rear beam ends. The cam member 425 is located just beneath the uppermost sprocket wheel 378 and is supported upon the frame structure 357 by support members 425'.

As the weighing fixtures are moved a short distance beyond the spool carrying conveyor, the cam-engaging extensions 403 of the fixtures leave the locking cam member 325 whereupon the balancing beams thereof may assume an angular position determined by the weight of the eggs supported thereby.

As previously indicated, the first sorting station passed by the egg-weighing fixtures is one at which grade C eggs are discharged from the fixture conveyor. The egg-discharging mechanism 299 is located at this sorting station. The mechanism 299 may comprise a solenoid 428 whose armature carries a laterally extending knife-edged tilt arm 429 which, upon energization of the solenoid, is raised to a level which engages the cam-engaging extension 403 of the adjacent fixture so as to tilt the egg support 419 to discharge the egg therefrom. The speed of the fixture conveyor and the position of the egg discharge mechanism 299 is such that each egg-weighing fixture is moved opposite the egg-discharging mechanism 299 as the trip arm 292 opposite the spools which previously carried the egg then on the latter fixture is moved opposite the roller 296. If the trip arm involved touches the roller 296, the solenoid 428 is energized to discharge the egg on the fixture then opposite the tilt arms 429.

The fixture conveyor next carries the fixtures past the second sorting station at which grade B eggs are discharged. The egg discharging mechanism 299' located at this sorting station is identical to the device 299 just described and so comprises a solenoid 428' and a knife-edged tilt arm 429'. As each egg-weighing fixture is moved opposite the mechanism 299', the associated trip arm is carried opposite the roller 300. Thus, as a grade B egg is moved opposite the egg-discharging mechanism 299', the associated trip arm 292 will engage the roller 300 to energize the associated solenoid which raises the tilt arm 429' and discharges the egg from the fixture involved in the manner previously described.

Next, the fixtures are carried opposite the various sorting stations at which grade A eggs of various weights are discharged.

For eggs varying in weight from the heaviest to the lightest weight classifications, the cam-engaging extensions 403 of the fixtures will assume progressively decreasing ranges of elevation. This provides a means for sorting eggs within given weight classifications. To this end, a number of cam elements 431, 432 and 434 are supported from a longitudinal channel member 436 supported above the platform of the support structure 357. Each of the cam elements has an upper arm (FIG. 7) 439, 440 or 442, and a depending intermediate arm 443, 444 or 446 and a bent-back lower arm inclining downwardly and rearwardly at 447, 448 or 450. The upper surfaces of the lower arms of these cam elements form respective cam surfaces which incline upwardly proceeding in the direction of movement of the fixture conveyor 295. The intermediate arms of these cam elements are pivotally secured by pivot screws 452 to the side of the channel member 436 at points opposite respective discharge stations 441, 445 and 449 for large, medium and small eggs (FIG. 1B).

The elevations of the bottom ends of these cam surfaces are determined by screws 454 threading through the upper arms of these elements and bearing upon the upper surface of the channel member 436. Locking nuts 456 are provided for fixing the adjusted position of these screws. The elevation of the bottom end of the first cam element is adjusted so that its upper surface intercepts the cam-engaging extensions of the weighing fixtures supporting eggs of the extra large classification. The bottom ends of the succeeding cam elements are adjusted respectively to intercept the cam-engaging extensions of fixtures carrying eggs respectively in the medium and small classifications. The bottom rear edges of the lower arms of the cam elements are beveled to provide pointed ends to prevent locking abutment between the sharp leading edges of the cam-engaging extensions of the fixtures and the cam elements. As a cam-engaging extension of one of the fixtures rides up one of the aforementioned cam surfaces of the cam elements 431, 432 or 434, the balancing beam of the associated fixture is raised to a point where the associated lift rod engages the rear end of the base 416 of the egg-receiving means to tilt the same to discharge the egg carried thereby.

The eggs discharged at the various sorting stations of the fixture conveyor are dropped upon an out-feeding conveyor 459. The out-feeding conveyor is supported upon a raised support platform 460 (FIG. 30) resting on legs 462. The conveyor 459 is a belt-type conveyor including an endless belt 464 which extends around friction rollers 466 and 468 fixed to shafts 470–472 journaled in bearings secured to the framework 357 and to the framework 460. A sprocket wheel 474 is secured to the shaft 472 and receives an endless chain 476 extending around a drive sprocket wheel 478 fixed to a shaft 480 journaled in a bearing 482 secured to the framework 357. A larger sprocket wheel 484 is secured to the shaft 480 and receives an endless chain 486 driven by a drive sprocket wheel 488. The drive sprocket wheel 488 is fixed to a shaft 490 journaled in bearings 492 supported upon a platform 496 secured to the framework 357. The shaft 490 carries a pulley 498 which is driven from a belt 500 driven by a drive pulley 502 secured to the shaft of an electric motor 504.

The upper section of the belt 464 is moved away from the conveyor 298 to carry the eggs to one of a number of bins 505. The bottoms of these bins slant slightly away from the end of the out-feeding conveyor 459 and are approximately at the same elevation as the upper section of the conveyor belt 464. The eggs are thus transferred to the bins with a minimum of shock and move slowly down to the forward bottom ends of the bins.

The grading, sorting and feeding apparatus above described is extremely rapid in operation and is much more simple and reliable than prior apparatus heretofore proposed. The handling of the eggs is accomplished in a manner which minimizes the breakage of the eggs, and with equipment which is relatively inexpensive to construct and maintain.

It should be understood that numerous modifications may be made of the preferred form of the invention above described without deviating from the broader aspects of the invention.

We claim:

1. A feeding, arranging and candling apparatus for eggs comprising a plurality of rollers arranged adjacent each other with their axes parallel, means for advancing the rollers along a path and rotating the same, feeding means for feeding eggs onto the advancing and rotating rollers, said eggs being advanced by the rollers and spun thereby about their long axes substantially parallel to the axes of the rollers and being discharged small ends first off of the ends of the rollers toward which the small ends of the eggs are pointing, conveyor means on each side of the advancing path of the rollers and movable parallel thereto and in the same direction for receiving and conveying the eggs discharged from the ends of the rollers, said conveyor means receiving and turning the eggs small end forwardly as they are discharged thereon, a single conveyor beyond the advancing path of the rollers and between said pair of conveyor means, means for transferring the eggs from the conveyor means onto the single conveyor in single file and small end forwardly to be conveyed thereby, a plurality of spools arranged adjacent each other with their axes parallel, means for advancing the spools along a path and rotating the same, means for transferring the eggs from the single conveyor onto the advancing and rotating spools and including means for turning the eggs to cause their long axes to be parallel to the axes of the spools and their small ends extending in the same direction, said eggs being advanced and spun about their long axes by the spools, candling means arranged adjacent to the advancing path of the spools, and means for tilting the spools as they pass the candling means to cause the advancing and spinning eggs to be tilted large end upwardly as they pass the candling means.

2. A feeding, arranging, candling and grading apparatus for eggs comprising a plurality of rollers arranged adjacent each other with their axes parallel, means for advancing the rollers along a path and rotating the same, feeding means for feeding eggs onto the advancing and rotating rollers, said eggs being advanced by the rollers and spun thereby about their long axes substantially parallel to the axes of the rollers and being discharged small end first off of the ends of the rollers toward which the small ends of the eggs are pointing, conveyor means on each side of the advancing path of the rollers and movable parallel thereto and in the same direction for receiving and conveying the eggs discharged from the ends of the rollers, said conveyor means receiving and turning the eggs small end forwardly as they are discharged thereon, a single conveyor beyond the advancing path of the rollers and between said pair of conveyor means, means for transferring the eggs from the conveyor means onto the single conveyor in single file and small end forwardly to be conveyed thereby, a plurality of spools arranged adjacent each other with their axes parallel, means for advancing the spools along a path and rotating the same, means for transferring the eggs from the single conveyor onto the advancing and rotating spools and including means for turning the eggs to cause their long axes to be parallel to the axes of the spools and their small ends extending in the same direction, said eggs being advanced and spun about their long axes by the spools, candling means arranged adjacent to the advancing path of the spools, means for tilting the spools as they pass the candling means to cause the advancing and spinning eggs to be tilted large end upwardly as they pass the candling means, weighing means, and means for transferring the eggs from the advancing and rotating spools onto the weighing means.

3. A feeding, arranging and candling apparatus for eggs comprising a platform moving in one direction and randomly receiving a plurality of eggs, a conveyor located at one end of the moving platform for receiving eggs therefrom and conveying them in single file and including means for positioning the eggs in parallel and equally spaced relation on the conveyor, a plurality of rollers arranged adjacent each other with their axes parallel, means for rotating the rollers and advancing the same along a path transversely to the path of the conveyor, feeding means for feeding eggs from the conveyor onto the advancing and rotating rollers, said eggs being advanced by the rollers and spun thereby about their long axes substantially parallel to the axes of the rollers and being discharged small end first off of the ends of the rollers toward which the small ends of the eggs are pointing, conveyor means on each side of the advancing path of the rollers and movable parallel thereto and in the same direction for receiving and conveying the eggs discharged from the ends of the rollers, said conveyor means receiving and turning the eggs small end forwardly as they are discharged thereon, a single conveyor beyond the advancing path of the rollers and between said pair of conveyor means, means for transferring the eggs from the conveyor means onto the single conveyor in single file and small end forwardly to be conveyed thereby, a plurality of spools arranged adjacent each other with their axes parallel, means for advancing the spools along a path and rotating the same, means for transferring the eggs from the single conveyor onto the advancing and rotating spools and including means for turning the eggs to cause their long axes to be parallel to the axes of the spools and their small ends extending in the same direction, said eggs being advanced and spun about their long axes by the spools, candling means arranged adjacent to the advancing path of the spools, and means for tilting the spools as they pass the candling means to cause the advancing and spinning eggs to be tilted large end upwardly as they pass the candling means.

4. A feeding, arranging, candling and grading apparatus for eggs comprising a platform moving in one direction and randomly receiving a plurality of eggs, a conveyor located at one end of the moving platform for receiving eggs threfrom and conveying them in single file, a plurality of rollers arranged adjacent each other with their axes parallel, means for rotating the rollers and advancing the same along a path transversely to the path of the conveyor, feeding means for feeding eggs from the conveyor onto the advancing and rotating rollers, said eggs being advanced by the rollers and spun thereby about their long axes substantially parallel to the axes of the rollers and being discharged small end first off of the ends of the rollers toward which the small ends of the eggs are pointing, conveyor means on each side of the advancing path of the rollers, and movable parallel thereto and in the same direction for receiving and conveying the eggs discharged from the ends of the rollers, said conveyor means receiving and turning the eggs small end forwardly as they are discharged thereon, a single conveyor beyond the advancing path of the rollers and between said pair of conveyor means onto the single conveyor in single file and small end forwardly to be conveyed thereby, a plurality of spools arranged adjacent each other with their axes parallel, means for transferring the eggs from the single conveyor onto the advancing and rotating spools and including means for turning the eggs to cause their long axes to be parallel to the axes of the spools and their small ends extending in the same direction, said eggs being advanced and spun about their long axes by the spools, candling means arranged adjacent to the advancing path of the spools, and means for tilting the spools as they pass the candling means to cause the advancing and spinning eggs to be tilted large end upwardly as they pass the candling means.

5. In a feeding, arranging and candling apparatus for eggs, a plurality of spools arranged adjacent each other with their axes parallel, a driven chain rotatably carrying the spools at one end for advancing the same along a path, a supporting platform engaged by the spools for supporting and rotating the spools as they are advanced, said platform having a portion for retaining the spools in horizontal position and a portion for tilting the spools as the spools are advanced along said path, means for feeding eggs onto the horizontally positioned spools with their long axes parallel to the axes of the spools and with their small ends facing in one direction, said eggs being advanced and spun by the advancing and rotating spools and being tilted large end upwardly as the spools are tilted, driven chain means parallel to said driven chain and driven at the same speed as said driven chain, a plurality of light boxes carried by said driven chain means and having lenses interposed between the tilted spools for continuously illuminating the advancing eggs as they are spinning large end upwardly for candling the same.

6. A feeding and arranging apparatus for eggs and the like comprising a plurality of rollers arranged adjacent each other with their axes parallel, means for advancing the rollers along a path normal to the axes of the rollers and rotating the rollers about their axes, feeding means for feeding eggs onto the advancing and rotating rollers, said rollers advancing the eggs along the advancing path of the rollers, arranging and spinning the eggs about their long axes substantially parallel to the axes of the rollers, and moving the eggs longitudinally along the rollers in the directions of their pointed ends towards the ends of the rollers to separate the eggs into two groups in accordance with the orientations of their pointed ends, a pluraliy of spools arranged adjacent each other with their axes parallel, means for advancing the spools along a path normal to the axes of the spools and rotating the spools about their axes, and means for separately receiving the two groups of eggs from the ends of said advancing and rotating rollers and delivering them with their small ends extending in the same direction to said spools, candling means arranged adjacent to the advancing path of the spools, and means for tilting the spools as they pass the candling means to cause the advancing and spinning eggs to be tilted large end upwardly as they pass the candling means.

7. In a feeding and candling machine for eggs or the like including a candling station, a first conveyor for carrying eggs past said candling station, lighting means at said candling station, and an endless conveyor extending parallel to said first conveyor at said candling station and moving at the same speed and in the same direction and repeatedly carrying said lighting means past the eggs at said candling station where the light therefrom passes through the wide ends of said eggs.

8. In a feeding and candling machine for eggs or the like including a candling station, a first conveyor for carrying eggs past said candling station, an endless conveyor extending parallel to said first canveyor at said candling station and moving at the same speed and in the same direction, and a plurality of longitudinally spaced light sources on said endless conveyor which light sources are repeatedly carried to said candling station and positioned to provide individual light sources directed at the wide ends of the eggs moving past said candling station.

9. In a feeding and candling machine for eggs and the like including a candling station, a plurality of spools arranged adjacent each other with their axes parallel, a first conveyor carrying the spools in longitudinally spaced relation from an inlet station past said candling station, said spools being mounted on said first conveyor for bodily swinging movement about horizontal axes extending longitudinally of the conveyor and being rotatable about axes extending transversely of the conveyor, means for rotating said spools as they are advanced by the conveyor and for moving the same between a horizontal position at said inlet station and an inclined position opposite said candling station, means for feeding eggs onto the horizontally positioned spools at said inlet station with the long axes of the eggs parallel to the axes of rotation of the spools and with their small ends facing in the same direction, said eggs being advanced and spun by the advancing and rotating spools and being tilted at said candling station with the large ends thereof extending upwardly, a second conveyor extending parrallel to said first conveyor at said candling station and moving at the same speed and in the same direction, and lighting means on said second conveyor at said candling station which direct light through the upper ends of the inclined eggs at said candling station.

10. In a machine for feeding and sorting eggs and the like and having an inspection station and a sorting station, conveyor means having discrete, longitudinally spaced, egg-carrying stations thereon for carrying eggs past said inspection and sorting stations, said conveyor means having opposite each of said egg-carrying stations moving past said inspection station grade identifying means for identifying the grade of the egg at the associated egg-carrying station, egg-discharging means at said sorting station which removes an egg passing thereby from said conveyor means when actuated, and actuating means positioned to be passed by said various grade identifying means in time sequence and in synchronism with the movement of the associated eggs past said sorting station for actuating said egg-discharging means when a grade identifying means passing thereby indicates that the egg associated therewith is a relatively poor grade egg.

11. In a machine for feeding and sorting eggs and the like and having an inspection station and a sorting station, conveyor means having discrete, longitudinally spaced, egg-carrying stations positioned thereon for carrying eggs past said inspection and sorting stations, said conveyor means having opposite each of said egg-carrying stations moving past said inspection station manually-operable trip means having at least two stable conditions which respectively signify a relatively good grade and a relatively poor grade of egg, egg-discharging means at said sorting station which removes an egg passing thereby from said conveyor means when actuated, and actuating means positioned to be passed by said manually operable trip means in time sequence and in synchronism with the movement of the associated egg past said sorting station for actuating said egg-discharging means when a trip means passing thereby indicates that the egg associated therewith is of a relatively poor grade.

12. In a machine for feeding and sorting eggs and the like and having an inspection station, a first sorting station at which eggs of a relatively poor grade are to be discharged and a series of sorting stations at which eggs of a relatively good grade having various sizes or weights are to be discharged, conveyor means having discrete, longitudinally spaced egg-carrying stations thereon for carrying eggs past said inspection station, said first sorting station and said series of sorting stations in the order named, said conveyor means having opposite each of said egg-carrying stations which are moved past said inspection station trip means having a first condition for identifying a relatively poor grade of egg, egg discharging means at said first sorting station for discharging eggs thereat from said conveyor means when actuated, the egg-carrying stations of said conveyor means which are moved past said sorting stations having associated therewith sorting means responsive to the size or weight of the egg carried thereby, first actuating means positioned to be passed by said trip means as the eggs carried by the associated egg-carrying stations are brought opposite said first sorting station, said first actuating means being responsive to the passage thereby of a trip means having a condition indicating a poor grade of egg by actuating the egg-discharging means thereat, and respective egg-discharging means at said series of sorting stations responsive to passage thereby of a sorting means which indicates that the egg carried by the associated egg-carrying pocket has the weight or size to be discharged at the associated sorting station by removing the associated egg from said conveyor means.

13. In a machine for feeding, inspecting and sorting eggs and the like and having an inspecting station, a first sorting station at which relatively low grade eggs are collected and a series of egg size or weight sorting stations, a first conveyor having discrete longitudinally spaced egg-carrying stations thereon for carrying eggs past said inspecting station, said first conveyor having opposite each of said egg-carrying stations thereof a manually operable trip arm having at least two stable positions which respectively indicate a relative low grade and a relatively good grade of egg, a second conveyor for receiving eggs from said first conveyor and having a series of longitudinally spaced egg-carrying pockets thereon for carrying eggs first past said first sorting station and then past said egg size or weight sorting stations, egg discharging means at said first sorting station for removing eggs passing thereby from said second conveyor when actuated, actuating means positioned opposite said first conveyor to be passed by said trip arms in synchronism with the passage of the previously associated eggs past said first sorting station, said actuating means being responsive to the passage thereby of a trip arm positioned to indicate a relatively low grade of egg for actuating said egg discharging means at said first sorting station, and respective egg discharging means at said various egg size or weight sorting stations responsive to the passage thereby of eggs having the size or weight to be discharged thereat for removing the eggs involved from said second conveyor.

14. In a machine for feeding and sorting eggs and the like and having an inspection station and discharge stations for grade A, B and C eggs, respectively, conveyor means having discrete, longitudinally spaced, egg-carrying stations thereon for carrying eggs past said inspection station and then past said discharge stations in sequence, said conveyor means having opposite each of said egg-carrying stations moving past said inspection station a manually operable grade identifying trip arm having an intermediate and opposite extreme positions for respectively identifying grade A, B and C eggs, respectively, respective egg-discharging means at said grade A, B and C egg discharge stations which remove eggs passing thereby from said conveyor means when actuated, first and second actuating means positioned to be passed by said various grade identifying trip arms in timed sequence and in synchronism with the movement of the associated eggs past said respective grade B and C discharge stations, said first actuating means being responsive to the passage of a grade identifying trip arm positioned to indicate a grade B egg for actuating the egg-discharging means at the discharge station for grade B eggs, said second actuating means being responsive to the passage of a grade identifying trip arm positioned to indicate a grade C egg for actuating the egg-discharging means at the discharge station for grade C eggs, and restoring means in the path of movement of said grade identifying trip arms after leaving said actuating means, said restoring means comprising spaced confronting camming wall surfaces converging in a forward direction and being in the path of movement of the trip arms in said extreme grade B and C identifying position for moving the latter trip arms into said intermediate grade A identifying position, the grade A eggs remaining after discharge of said grade B and C eggs being carried to and discharged at said grade A discharge station.

15. In a machine for feeding and sorting eggs and the like having an inspection station and a sorting station, conveyor means having discrete, longitudinally spaced, egg-carrying stations positioned thereon for carrying eggs past said inspection and sorting stations, said conveyor means having opposite each of said egg-carrying stations moving past said inspection station manually operable trip means having at least two stable conditions which respectively signify a relatively good grade and a relatively poor grade of egg, egg-discharging means at said sorting station which removes an egg passing thereby from said conveyor means when actuated, actuating means positioned to be passed by said manually operable trip means in timed sequence and in synchronism with the movement of the associated egg past said sorting station for actuating said egg-discharging means when a trip means passing thereby indicates that the egg associated therewith is of a relatively poor grade, and restoring means positioned to be passed by said manually operable trip means after leaving said actuating means for returning the trip means having a condition identifying a relatively poor grade egg to a condition identifying a relatively good grade egg.

16. An egg carrying fixture comprising: an egg carrier support, a pocket-forming member mounted on said egg carrier support for tilting movement with respect thereto about a horizontal axis, said pocket-forming member having an elongated spoon-like portion oriented with its longitudinal axis extending normal to the tilt axis thereof, said spoon-like portion having a longitudinally extending oval shaped opening in the bottom thereof of a size which is substantially smaller than the smallest egg to be accommodated thereby and which enables the member to stably support eggs of widely varying sizes, and means for engaging said pocket-forming member and tilting the same to discharge the eggs thereon, the end of said spoon-like portion which is tilted downwardly being truncated to enable an egg to readily roll off the pocket-forming member when the same is tilted.

References Cited in the file of this patent

UNITED STATES PATENTS

| | | |
|---|---|---|
| 2,020,511 | McHenry | Nov. 12, 1935 |
| 2,070,980 | Wyland | Feb. 16, 1937 |
| 2,261,303 | Smith | Nov. 4, 1941 |
| 2,451,836 | Jordan | Oct. 19, 1948 |
| 2,645,344 | Hayter | July 14, 1953 |
| 2,648,430 | Wilson | Aug. 11, 1953 |
| 2,843,250 | Niederer | July 15, 1958 |
| 2,849,913 | Bohlman | Sept. 2, 1958 |
| 2,919,787 | Reck | Jan. 5, 1960 |